United States Patent
Bishel et al.

(10) Patent No.: US 6,260,873 B1
(45) Date of Patent: Jul. 17, 2001

(54) ISOLATION HITCH

(75) Inventors: Steven George Bishel, Cuyahoga Falls; Shaobo Liu, Hudson, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/650,238

(22) Filed: Aug. 29, 2000

(51) Int. Cl.⁷ ..................................................... B60D 1/155
(52) U.S. Cl. ........................ 280/486; 280/432; 280/485; 267/138
(58) Field of Search ..................................... 280/483, 484, 280/485, 486, 432; 267/138, 294, 291, 72, 64.11; 188/322.15, 322.19

(56) References Cited

U.S. PATENT DOCUMENTS

| | | | |
|---|---|---|---|
| 1,734,072 | * | 11/1929 | Blalack . |
| 1,991,684 | * | 2/1935 | Ketel . |
| 2,783,039 | * | 2/1957 | Wilson . |
| 3,881,577 | * | 5/1975 | Wherry et al. ........................ 188/112 |
| 4,029,307 | * | 6/1977 | Nielson ................. 267/138 |
| 4,114,921 | * | 9/1978 | Thorell et al. ........................ 280/478 |
| 4,817,978 | * | 4/1989 | James ................... 280/487 |
| 4,968,010 | * | 11/1990 | Odobasic .............................. 267/162 |
| 4,978,133 | * | 12/1990 | Thorne et al. ....................... 280/484 |
| 5,195,768 | * | 3/1993 | Hendrix ................. 280/428 |

* cited by examiner

Primary Examiner—Brian L. Johnson
Assistant Examiner—Avraham H. Lerner
(74) Attorney, Agent, or Firm—David E. Wheeler

(57) ABSTRACT

An apparatus, interposed between and attached to a drive vehicle and an object to be moved, dampens the force (drive, resistance, inertia, etc.) between them. The apparatus has a rigid structure which is capable of transferring the large forces required to pull the object, from the drive vehicle to the object, but uses damping to moderate the impact of the forces on the drive vehicle/object combination.

3 Claims, 4 Drawing Sheets

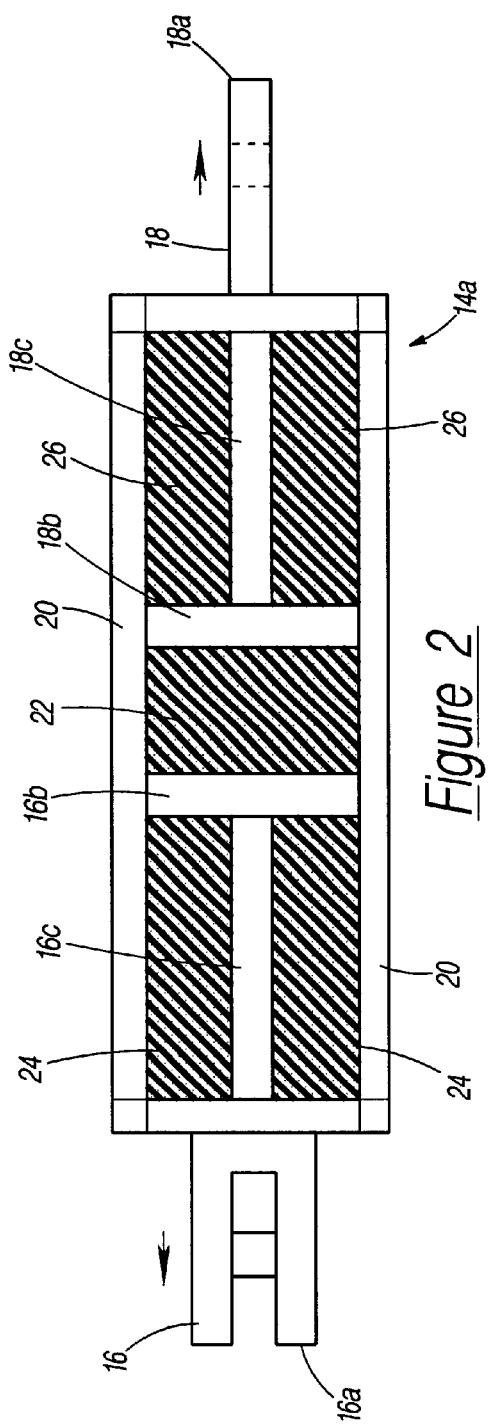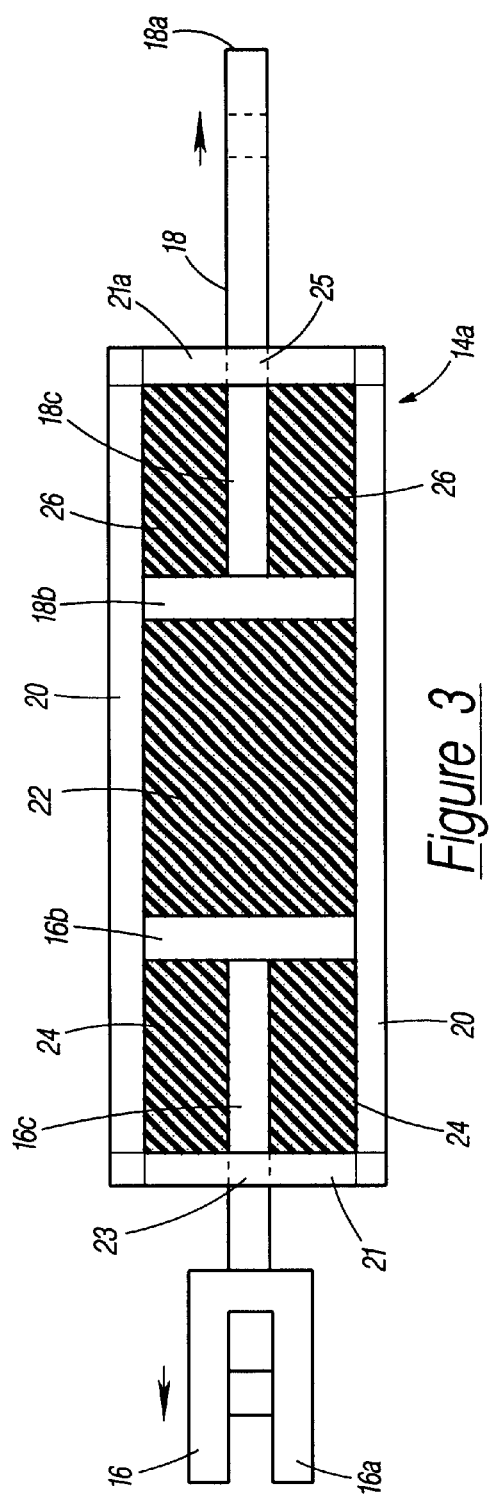

ISOLATION HITCH

FIELD OF THE INVENTION

The invention relates to a hitch for connecting a drive vehicle to an object which is to be moved. The hitch has means for damping forces between the object and the drive vehicle.

BACKGROUND OF THE INVENTION

Although the hitch of the invention may be used in a number of various applications, for ease of illustration, the invention will be discussed primarily as it relates to the phenomenon known as power hop. Power hop is a condition of vehicle in which a vehicle (tractor) bounces, primarily in the vertical mode, and causes ride discomfort for the vehicle operator. Power hop occurs when a vehicle (tractor) is pulling an attachment (implement) which applies a significant resistance force to the vehicle. This resistance force of the attachment in the fore-aft (tangential) direction can reach up to 50% to 100% of the vertical load of the vehicle, and is constantly varying. This resistance force of the attachment is referred to as the drawbar load. The variation of these resistance forces contributes to power hop. Power hop can occur on any surface, with any vehicle pulling any sort of object. An agricultural tractor pulling an implement (disk, chisel plow, field cultivator, subsoiler ripper) under soil tillage conditions is one such example.

It is an object of the invention to provide a device designed to minimize or eliminate the occurrence of power hop by dampening the variation of the resistance forces between the vehicle and its implement, and by isolating or modulating the frequency variations of the drawbar load.

It often occurs, when a vehicle pulls an object, such as when a truck tractor pulls a trailer, or a farm tractor pulls a plow, or a truck or tractor pulls a tree stump, that forces directly applied by the drive vehicle (tractor), by the drive tires through the hitch connecting the drive vehicle with the object, must overcome an initial large resistance to movement (inertia, friction, surface tension) by the object, i.e., the trailer, plow or tree stump, before the object begins to move. Before the object begins to move, the forces exerted by the drive vehicle are stored as energy somewhere in the drive vehicle or between the drive vehicle and the object. Often, when the resistance is overcome, and the object begins to move, all the stored energy is released in the instant of first movement, and the object lurches or hops ahead, or if the object doesn't move, the drive vehicle begins to hop.

It is another object of the present invention to provide a connection means between a drive vehicle and an object that smoothes out the variation of resistive forces in order to reduce or eliminate lurch or hop of an object to be moved, or the hop of a drive vehicle.

Other objects of the invention will be apparent from the following description and claims.

SUMMARY OF THE INVENTION

The invention relates to a hitch for connecting a drive vehicle to an object to be moved. The hitch of the invention comprises (a) a rigid container for containing a damping means, (b) a first connecting means associated with a first end of the rigid container wherein an exterior portion of the first connecting means is outside the rigid container, and the first connecting means is movable relative to the rigid container, (c) a second connecting means associated with a second end of the rigid container wherein an exterior portion of the second connecting means is outside the rigid container, and the second connecting means is movable relative to the rigid container, (d) and the damping means interacts with the first and second connecting means.

In one illustrated embodiment of the invention, the hitch comprises a box of rigid material having a cross section having at least two parallel sides wherein a first connecting means is associated with a first end of the box, and an exterior portion of the first connecting means is outside the box and an interior portion is within the box, and the first connecting means is movable relative to the box between the at least two parallel sides, and a second connecting means is similarly disposed. Elastomeric material may be used as the damping means.

In another embodiment, the container of the hitch may comprise a cylinder made of a rigid material, wherein said first and second connecting means are associated with opposed ends of the cylinder. A hydraulic fluid may be contained within the cylinder to restrict the movement of the first and second connecting means.

In another embodiment, the hitch may comprise a rigid container made of a rigid material wherein a first spring is contained within the rigid container between the first and second connecting means, a second spring is contained within the rigid container between a first end of the rigid container and the first connecting means, and a third spring is within the rigid container between a second end of the rigid container and the second connecting means.

In a further embodiment, the hitch may include a hydraulic fluid contained within said container in combination with springs.

Also provided is a drive vehicle/object combination connected together using the hitch of the invention.

Also provided is a method for connecting a driving vehicle to an object using the hitch of the invention.

BRIEF DESCRIPTION OF THE DRAWINGS

FIGS. 2 and 3 illustrate two different configurations of a representation of the hitch of the invention, illustrating its movements in use.

DETAILED DESCRIPTION OF THE INVENTION

The invention is directed primarily toward the use of heavy vehicles that are used for pulling attachments with high resistive forces.

Figure 1:
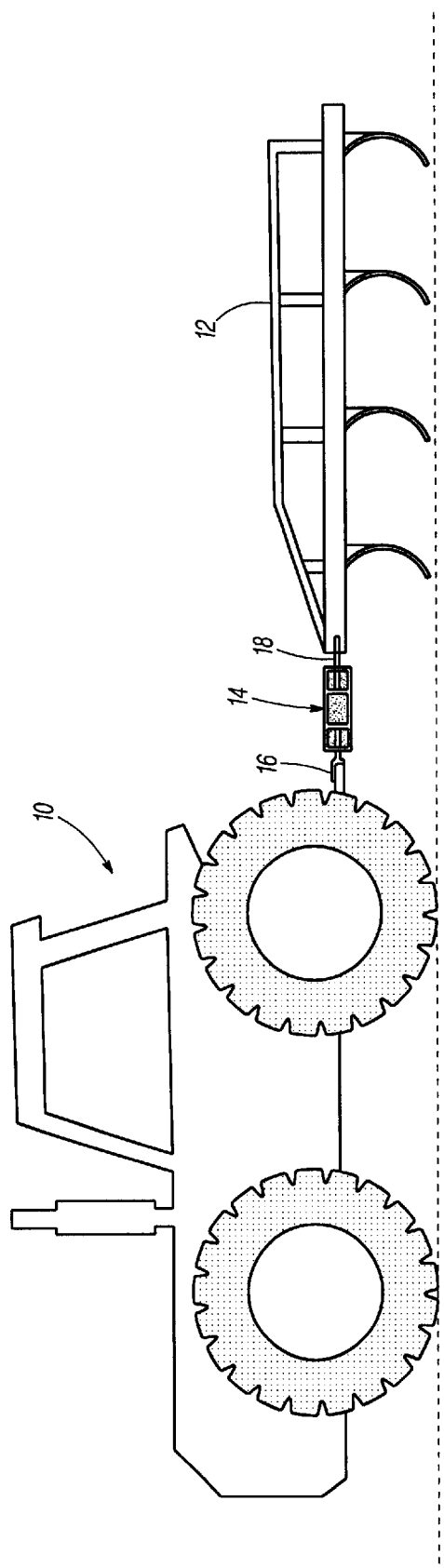
FIG. 1 illustrates a drive vehicle (a farm tractor) pulling an object (a farm implement known as a subsoiler ripper).

With reference now to FIG. 1, a driving vehicle 10, illustrated as a farm tractor, is shown pulling an object 12, illustrated as a subsoiler ripper. The driving vehicle 10 is connected to the object 12 by a hitch 14. The hitch 14 is connected to the driving vehicle by connecting means 16, and is connected to the object 12 by connecting means 18. A hitch and its connecting means is typically designed sufficiently robust to transfer forces, required for movement of the object, from the driving vehicle to the object, and is sufficiently flexible in the connection to permit turning and maneuvering of the driving vehicle/object combination, when applicable.

With reference now to FIGS. 2 and 3, in a representative embodiment of the invention, hitch 14a comprises rigid side walls 20 and end walls 21,21a which contain driving vehicle connecting means 16 and object connecting means 18 in addition to damping medium(s) 22, 24, 26. Damping mediums 22, 24, 26 may comprise the same elastomer, or different elastomers, or other damping means, which are disposed in an interactive relationship with connecting means 16 and 18. The rigid walls 20 may partially or completely contain the damping medium, depending on the nature of the medium and how much damping is needed.

Connecting means 16 and 18 are captured by, but not connected to hitch 14a, and are movable with respect to hitch 14a. Rod 16c of connecting means 16 passes through hole 23 in end 21 of hitch 14a, and rod 18a passes through hole 25 in opposed end 21a. Damping means 24 is disposed between end 21 of hitch 14a and end 16b of connecting means 16, and damping means 26 is disposed between end 21a of hitch 14a and end 18b of the connecting means 18. Damping means 22 is disposed between end 16b of connecting means 16 and end 18b of connecting means 18.

When damping means 22, 24, 26 are elastomers, and a tractor is applying a pulling force on connecting means 16, and an implement is resisting movement, elastomers 24 and 26 are in compression, and elastomer 22 is in extension (see FIG. 3), because of forces tending to move end 16b of connecting means 16 in the direction of end 21, and end 18b of connection 18 in the direction of end 21a. Accordingly, elastomers 24 and 26 provide increasing resistance to the movement of ends 16b and 18b the closer they get to ends 21 and 21a, respectively, because of the energy stored in a compressed elastomer that tends to return the elastomer to its original condition. Elastomer 22 provides increasing resistance to the movement of connecting means 16 and 18, because of the energy stored by an extended elastomer that tends to return the elastomer to its original state. Thus, the hitch has a damping effect on the variations of the resistance forces between the drive vehicle and the object, such that it smoothes out the large variation in resistance forces to provide more constant resistance force. Through this more constant resistance force, the occurrence of power hop is minimized or eliminated.

When an agricultural tractor pulls an implement in heavy tillage conditions, and the soil condition and resistance of the soil are such that the resistance forces are at a frequency that is similar to the natural frequency of the drive vehicle, power hop may occur. Power hop has been observed to increase in severity with increased horse power (HP) of the drive vehicle, the use of four wheel drive and radial tires, and a percentage increase in wheel slip.

Hitch 14a damps the excessive variations of the forces developed when an agricultural tractor pulls a object (implement), which steadies the hopping of the drive vehicle during movement of the drive vehicle/object combination, This control is achieved by isolating or modulating the frequency variations in the pulled implement, and damping the variations of the resistive force transferred from the implement to the pulling vehicle (tractor).

Figure 4:
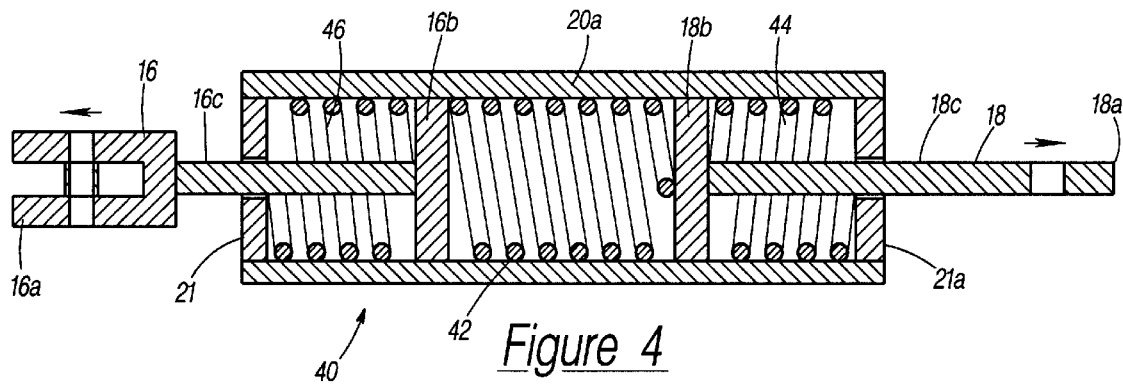
FIG. 4 illustrates an alternative construction of the hitch of the invention.
Figure 5:
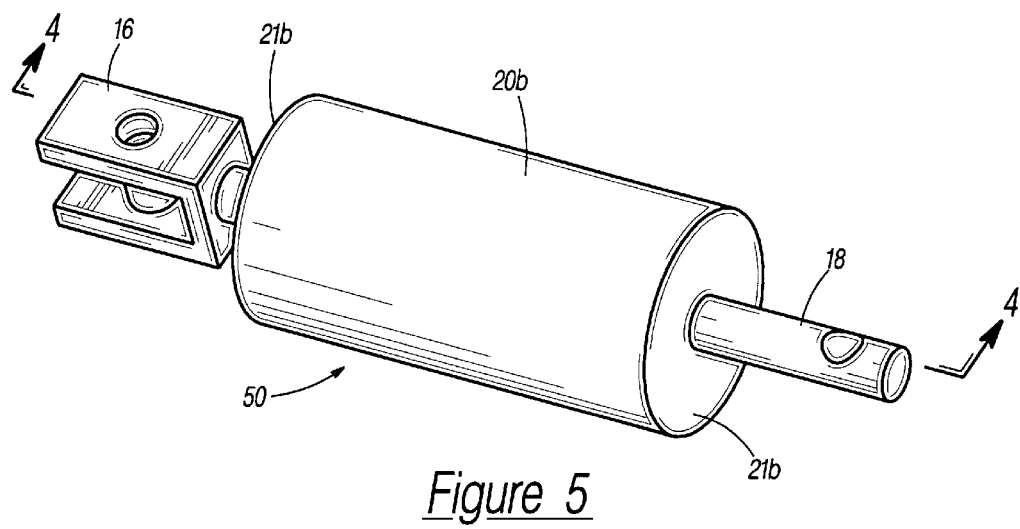
FIG. 5 illustrates a second alternative construction of the hitch of the invention.
Figure 7:
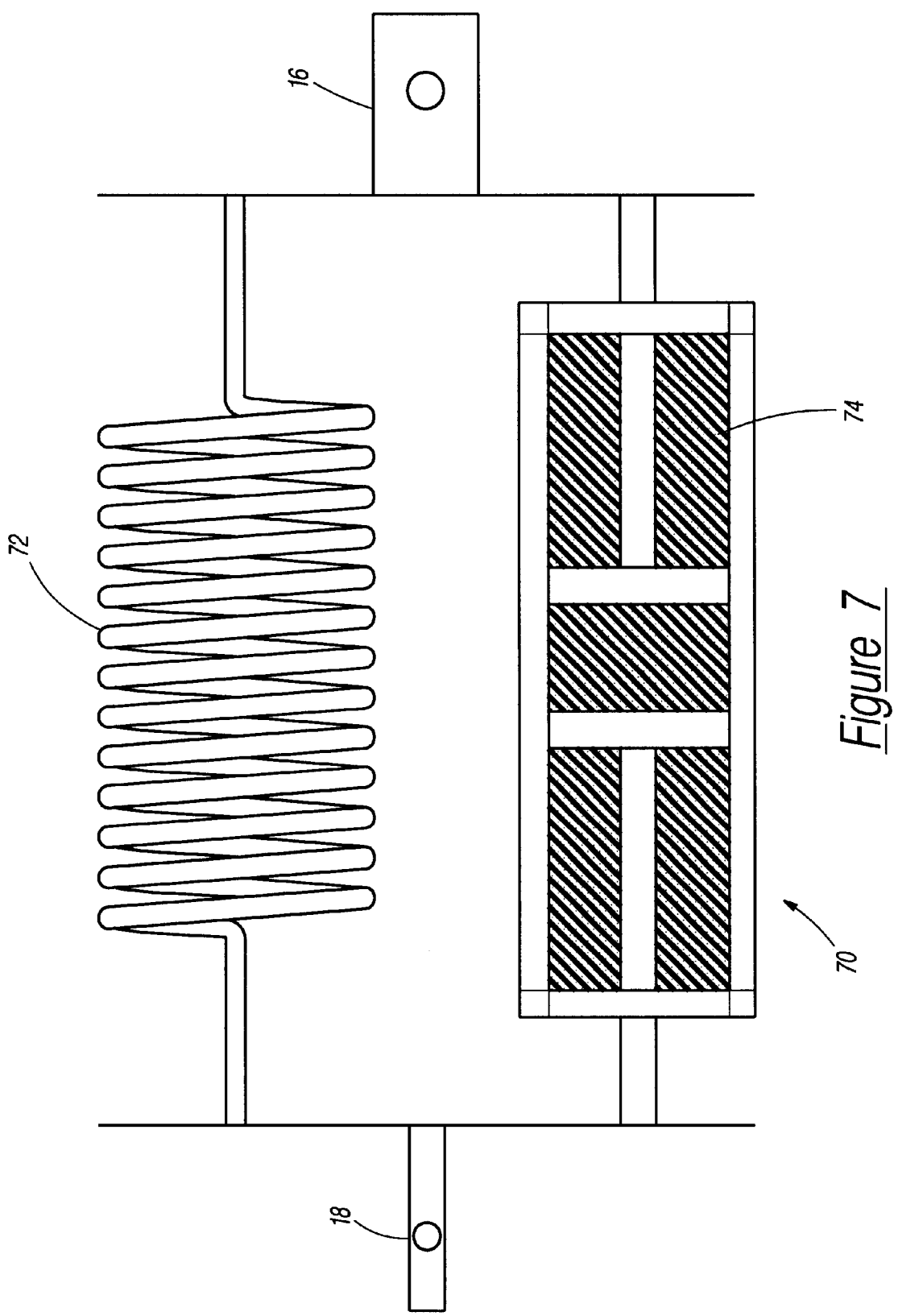
FIG. 7 illustrates a representation of a spring type dampener in conjunction with a hydraulic dampener.

With reference now to FIGS. 4, 5 and 7 in possible embodiments of the invention, springs and/or dampers can be used in place of elastomer to serve the same function as an elastomer. In hitch 40, springs can be either in compression or tension, while the damper absorbs the energy of excess forces. In hitch 40 springs 42, 44, 46 are contained within side walls 20a and ends 21, 21a. When a tractor pulls connecting means 16, springs 44 and 46 go into compression, and spring 42 goes into extension, functioning in the same manner discussed above with respect to elastomers 22, 24, 26.

With reference now to FIG. 5, in a further embodiment, the hitch 50 may be in the form of a cylinder having ends 21b and tubular side 20b. In addition to elastomers or springs, such a cylinder has the capability of containing a fluid, preferably a viscous fluid, that is capable of providing a damping function. For example, if a hydraulic fluid is disposed around rods 16c and 18c (see FIG. 4), and between ends 16b and 18b of connecting means 16 and 18, and hydraulic channels provided between cylinder ends 21b and connecting means ends 16b and 18b, respectively, and between ends 16b and 18b of connecting means 16 and 18, the hydraulic fluid will absorb some of the excess energies generated by pulling the object.

Those skilled in the art will recognize that hydraulic fluid, when channeled as is within the abilities of one in the field of hydraulics, will dampen the energies only, and will provide little or no energy for restoration to a steady state position.

A hydraulic fluid provides a resistive as well as a damping force. Accordingly, as the connecting means moves to an extreme end of the hitch, resistance increases, and more force is applied by the drive vehicle to the object through the hydraulic fluid. As he object moves in response, the damping action of the fluid permits the return of the connecting means closer to its starting position in the hitch without noticeable loss in the force applied between the drive vehicle and the object, and the hitch is in position to respond to the next variation in resistive force.

This responsive damping interaction can be enhanced and the equilibrium position of the connecting means in the hitch can be maintained by using an external pressure source, e.g. by attaching the hitch to the tractor's hydraulic system.

Figure 6:
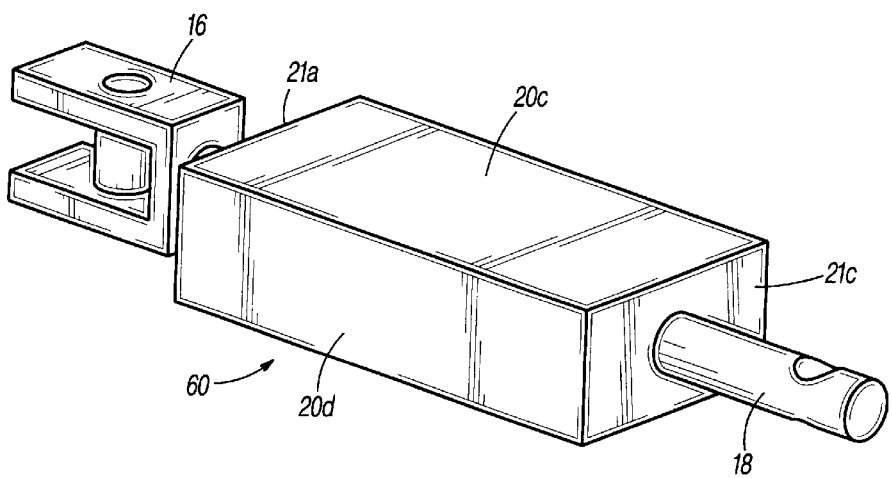
FIG. 6 illustrates a representation of a possible configuration of the hitch of the invention.

With reference now to FIG. 6, hitch 60 is shown in the form of a box with sides 20c and 20d and ends 21c. The embodiment of FIG. 6 illustrates that the hitch can be made in any convenient shape, as needed or desired for a specific application. Hitch 60 can use elastomers, springs and/or dampers, hydraulic fluid, or any other damping means known to those skilled in the art for the damping function. In a particularly desirable embodiment in hitch 70, springs 72 may be used in conjunction with a hydraulic damping means 74 (FIG. 7), to provide a shock absorber type arrangement, to provide the benefits of the spring damping and restoration with the damping benefits of hydraulic action.

The hitch of the invention may be permanently affixed to the drive vehicle or to the object, or interposed between them whenever connection between them is needed.

While the invention has been specifically illustrated and described, those skilled in the art will recognize that the invention can be variously modified and practiced without departing from the spirit of the invention. The invention is limited only by the following claims.

What is claimed is:

1. A hitch for connecting a driving vehicle to an object to be moved comprising
   a) a box of rigid material having a cross section having at least two parallel sides
   b) a first connecting means associated with a first end of said box wherein an exterior portion of said first connecting means is outside said box and an interior portion is within said box, and said first connecting means is movable relative to said box between said at least two parallel sides (c) a second connecting means associated with a second end of said box wherein an exterior portion of said second connecting means is outside said box and an interior portion is within said box, and said second connecting means is movable relative to said box between said at least two parallel sides d) a first elastomeric material disposed within said box between said first connecting means and said second connecting means e) a second elastomeric material disposed within said box between the interior portion of said first connecting means and said box, and f) a third elastomeric material disposed within said box between the interior portion of said second connecting means and said box.

2. A hitch for connecting a driving vehicle to an object to be moved comprising (a) a rigid container made of a rigid material (b) a first connecting means associated with a first end of said rigid container wherein an exterior portion of said first connecting means has a first end outside said rigid container and an interior portion with a second end within said rigid container, said first connecting means being movable relative to said rigid container (c) a second connecting means associated with a second end of said rigid container wherein an exterior portion of said second connecting means is outside said rigid container and an interior portion is within said rigid container, and said second connecting means is movable relative to said rigid container, (d) a first spring contained within said rigid container between said first and second connecting means, a second spring contained within said rigid container between a first end of said rigid container and said first connecting means, and a third spring within said rigid container between a second end of said rigid container and said second connecting means.

3. A hitch for connecting a driving vehicle to an object to be moved comprising (a) a container made of a rigid material (b) a first connecting means associated with a first end of said container wherein an exterior portion of said first connecting means is outside said container and an interior portion with a second end is within said container, and said first connecting means is movable relative to said container (c) a second connecting means associated with a second end of said container wherein an exterior portion of said second connecting means is outside said container and an interior portion with a second end is within said container, and said second connecting means is movable relative to said container, (d) a hydraulic fluid contained within said container where hydraulic fluid restricts the movement of said fluid and second connecting means, and (e) a first spring contained within said rigid container between said first and second connecting means, a second spring contained within said rigid container between a first end of said rigid container and said first connecting means, and a third spring within said rigid container between a second end of said rigid container and said second connecting means.

* * * * *